United States Patent
Niimi et al.

(10) Patent No.: US 10,654,360 B2
(45) Date of Patent: May 19, 2020

(54) FOUR-WHEEL DRIVE VEHICLE AND METHOD FOR CONTROLLING THE FOUR-WHEEL DRIVE VEHICLE

(71) Applicant: JTEKT CORPORATION, Osaka-shi (JP)

(72) Inventors: Shotaro Niimi, Kariya (JP); Go Nagayama, Toyama (JP); Kotaro Sarai, Nishio (JP)

(73) Assignee: JTEKT CORPORATION, Osaka-shi (JP)

( * ) Notice: Subject to any disclaimer, the term of this patent is extended or adjusted under 35 U.S.C. 154(b) by 205 days.

(21) Appl. No.: 15/993,653

(22) Filed: May 31, 2018

(65) Prior Publication Data
US 2018/0345787 A1  Dec. 6, 2018

(30) Foreign Application Priority Data

Jun. 1, 2017  (JP) ................. 2017-109136

(51) Int. Cl.
| | |
|---|---|
| *B60K 17/348* | (2006.01) |
| *F16D 11/00* | (2006.01) |
| *F16D 25/0638* | (2006.01) |
| *F16D 25/10* | (2006.01) |
| *B60K 23/08* | (2006.01) |
| *F16D 11/14* | (2006.01) |

(Continued)

(52) U.S. Cl.
CPC ............ *B60K 17/348* (2013.01); *B60K 23/08* (2013.01); *F16D 11/00* (2013.01); *F16D 11/14* (2013.01); *F16D 13/52* (2013.01); *F16D 25/0638* (2013.01); *F16D 25/082* (2013.01); *F16D 25/10* (2013.01); *B60K 5/04* (2013.01); *B60K 17/02* (2013.01); *B60K 2023/0833* (2013.01); *B60K 2023/0866* (2013.01); *B60Y 2400/421* (2013.01); *B60Y 2400/424* (2013.01); *F16D 2011/002* (2013.01); *F16D 2011/008* (2013.01)

(58) Field of Classification Search
CPC .............................. B60K 17/348; B60K 23/08
See application file for complete search history.

(56) References Cited

U.S. PATENT DOCUMENTS

| | | | | |
|---|---|---|---|---|
| 5,135,071 | A * | 8/1992 | Shibahata | B60K 17/348 180/245 |
| 9,718,355 | B2 * | 8/2017 | Osborn | B60W 10/119 |

(Continued)

FOREIGN PATENT DOCUMENTS

JP  2016-30477  3/2016

*Primary Examiner* — Jacob D Knutson
*Assistant Examiner* — Conan D Duda
(74) *Attorney, Agent, or Firm* — Oblon, McClelland, Maier & Neustadt, L.L.P.

(57) ABSTRACT

A four-wheel drive vehicle includes a dog clutch that selectively interrupts transmission of a drive force to a propeller shaft, first and second multi-plate clutches that selectively interrupt transmission of the drive force from the propeller shaft to left and right rear wheels, first and second pistons that press the first and second multi-plate clutches, and a hydraulic circuit that supplies hydraulic oil to first and second cylinder chambers. During a transition to a four-wheel drive mode, torque transmitted through the first multi-plate clutch increases the speed of rotation of the propeller shaft so as to engage the dog clutch, and the second multi-plate clutch is kept from transmitting torque to the propeller shaft.

4 Claims, 11 Drawing Sheets

(51) Int. Cl.
*F16D 25/08* (2006.01)
*F16D 13/52* (2006.01)
*B60K 17/02* (2006.01)
*B60K 5/04* (2006.01)

(56) References Cited

U.S. PATENT DOCUMENTS

| | | | |
|---|---|---|---|
| 2010/0274456 A1* | 10/2010 | Kondo | B60K 23/08 701/69 |
| 2011/0218715 A1* | 9/2011 | Duraiswamy | B60K 17/36 701/51 |
| 2012/0024614 A1* | 2/2012 | Sigmund | B60K 23/0808 180/248 |
| 2013/0131942 A1* | 5/2013 | Duraiswamy | F16D 43/284 701/67 |
| 2013/0337960 A1* | 12/2013 | Valente | B60K 23/08 475/198 |
| 2015/0111696 A1* | 4/2015 | Maeda | B60K 23/08 477/79 |
| 2015/0321553 A1* | 11/2015 | Pritchard | F16H 61/0206 192/48.601 |
| 2016/0023550 A1* | 1/2016 | Onitake | B60K 17/348 180/247 |
| 2016/0280064 A1* | 9/2016 | Nozu | B60K 17/34 |
| 2016/0355088 A1* | 12/2016 | Saegusa | F16D 25/082 |
| 2017/0036540 A1* | 2/2017 | Yoshimura | B60K 17/344 |
| 2018/0099563 A1* | 4/2018 | Nozu | B60K 23/0808 |
| 2018/0111479 A1* | 4/2018 | Grutter | B60K 17/344 |
| 2018/0134154 A1* | 5/2018 | Shimizu | B60K 17/344 |

* cited by examiner

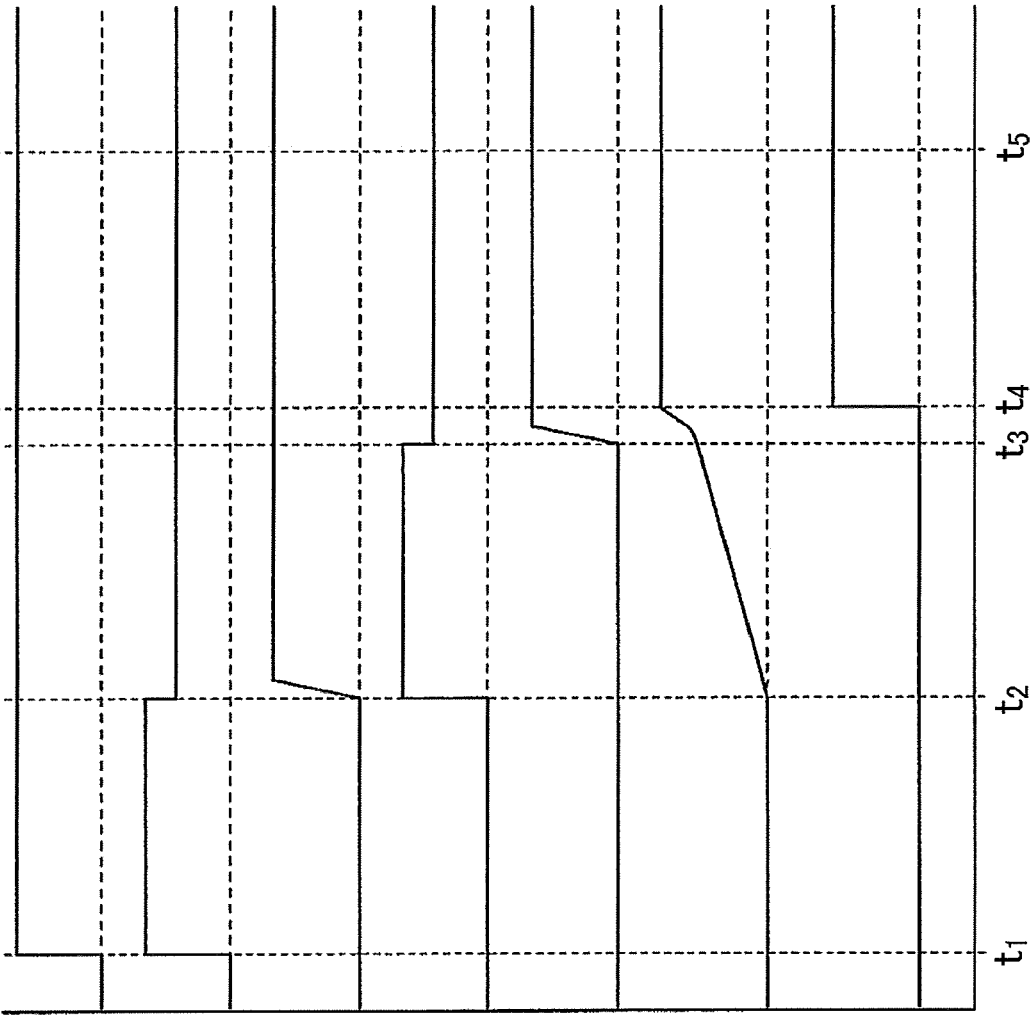

FOUR-WHEEL DRIVE VEHICLE AND METHOD FOR CONTROLLING THE FOUR-WHEEL DRIVE VEHICLE

INCORPORATION BY REFERENCE

The disclosure of Japanese Patent Application No. 2017-109136 filed on Jun. 1, 2017 including the specification, drawings and abstract, is incorporated herein by reference in its entirety.

BACKGROUND OF THE INVENTION

1. Field of the Invention

The invention relates to a four-wheel drive vehicle switchable between a four-wheel drive mode that transmits a drive force of a drive source to both a pair of main drive wheels and a pair of auxiliary drive wheels, and a two-wheel drive mode that transmits the drive force to only the pair of main drive wheels. The invention also relates to a method for controlling the four-wheel drive vehicle.

2. Description of Related Art

There are four-wheel drive vehicles that are switchable between a four-wheel drive mode and a two-wheel drive mode in accordance with vehicle traveling conditions. The present applicant has disclosed this type of four-wheel drive vehicle in Japanese Patent Application Publication No. 2016-30477 (JP 2016-30477 A).

The four-wheel drive vehicle disclosed in JP 2016-30477 A includes the following: a dog clutch that selectively interrupts the transmission of a drive force from a drive source to a propeller shaft; a drive shaft that rotates by the drive force transmitted from the propeller shaft; a pair of hydraulic clutches each located between the drive shaft and a corresponding one of a pair of left and right auxiliary driving wheels; a hydraulic unit that supplies hydraulic oil to the pair of hydraulic clutches to bring multiple clutch plates into frictional contact with each other; and a control device that controls the hydraulic unit. When the vehicle travels in the two-wheel drive mode, the control device disengages the dog clutch and the pair of hydraulic clutches, thereby stopping the rotation of the propeller shaft. This reduces power loss that is caused by the rotation of the propeller shaft, thus improving fuel economy performance.

On the other hand, when switching the vehicle from the two-wheel drive mode to the four-wheel drive mode, the controller increases the speed of the rotation of the propeller shaft by using torque transmitted from the auxiliary drive wheels through the hydraulic clutches so as to synchronize the rotations of a pair of meshable members of the dog clutch, and brings the pair of meshable members into mesh with each other after the synchronization is achieved. In order to switch the vehicle to the four-wheel drive mode quickly, the controller starts to supply hydraulic oil to one of the pair of hydraulic clutches before starting to supply hydraulic oil to the other of the pair of hydraulic clutches, or the controller supplies more hydraulic oil to one hydraulic clutch than to the other hydraulic clutch. This approach allows clutch plates of one hydraulic clutch to come into frictional contact with each other quickly, compared to supplying the same amount of hydraulic oil to the two hydraulic clutches at the same time. Thus, the speed of the rotation of the propeller shaft is increased quickly so that it takes less time for the vehicle to switch from the two-wheel drive mode to the four-wheel drive mode.

As described above, the four-wheel drive vehicle disclosed in JP 2016-30477 A allows quick switching from the two-wheel drive mode to the four-wheel drive mode. However, if the clutch plates of the other hydraulic clutch come into frictional contact with each other while the torque transmitted from one hydraulic clutch increases the speed of the rotation of the propeller shaft, torque transmitted from the other hydraulic clutch also increases the speed of the rotation of the propeller shaft. As a result, the rotational speed of the propeller shaft increases sharply. The sharp change in the rotational speed of the propeller shaft may produce noise and vibration (NV) depending on the stiffness of a drive force transmission system and therefore may make a driver and passengers feel a sense of discomfort. The four-wheel drive vehicle disclosed in JP 2016-30477 A has some room for improvement in this respect.

SUMMARY OF THE INVENTION

A purpose of the invention is to provide a four-wheel drive vehicle and a method for controlling the four-wheel drive vehicle that allow quick switching from a two-wheel drive mode to a four-wheel drive mode while suppressing the occurrence of noise and vibration at the time of switching.

A first aspect of the invention provides a four-wheel drive vehicle that is switchable between a four-wheel drive mode and a two-wheel drive mode. The four-wheel drive mode transmits a drive force from a drive source to both a pair of main drive wheels and a pair of auxiliary drive wheels. The two-wheel drive mode transmits the drive force to only the pair of main drive wheels. The four-wheel drive vehicle includes the following: a propeller shaft that transmits the drive force to the pair of auxiliary drive wheels in the four-wheel drive mode; a dog clutch that includes a pair of meshable members rotatable relative to each other and that selectively interrupts transmission of the drive force from the drive source to the propeller shaft; a first multi-plate clutch that selectively interrupts transmission of the drive force from the propeller shaft to a first auxiliary drive wheel of the pair of auxiliary drive wheels; a second multi-plate clutch that selectively interrupts transmission of the drive force from the propeller shaft to a second auxiliary drive wheel of the pair of auxiliary drive wheels; a first piston that axially presses the first multi-plate clutch; a second piston that axially presses the second multi-plate clutch; a hydraulic circuit that includes a hydraulic pump and multiple control valves and that supplies, through the control valves, hydraulic oil discharged from the hydraulic pump to first and second cylinder chambers that are provided respectively for the first and second pistons; and a control device that controls the dog clutch and the hydraulic circuit. During travel of the four-wheel drive vehicle in the two-wheel drive mode, the control device stops rotation of the propeller shaft by disengaging the dog clutch, the first multi-plate clutch, and the second multi-plate clutch. During a transition from the two-wheel drive mode to the four-wheel drive mode, the control device increases the speed of the rotation of the propeller shaft by using torque transmitted from the first auxiliary drive wheel through the first multi-plate clutch so as to achieve rotational synchronization between the pair of meshable members, and brings the pair of meshable members into mesh with each other after the rotational synchronization is achieved. During the transition, the control device keeps the second multi-plate clutch from transmitting torque that increases the speed of the rotation of the propeller shaft.

A second aspect of the invention provides a method for controlling a four-wheel drive vehicle that is switchable between a four-wheel drive mode and a two-wheel drive mode. The four-wheel drive mode transmits a drive force from a drive source to both a pair of main drive wheels and a pair of auxiliary drive wheels. The two-wheel drive mode transmits the drive force to only the pair of main drive wheels. The four-wheel drive vehicle includes the following: a propeller shaft that transmits the drive force to the pair of auxiliary drive wheels in the four-wheel drive mode; a dog clutch that includes a pair of meshable members rotatable relative to each other and that selectively interrupts transmission of the drive force from the drive source to the propeller shaft; a first multi-plate clutch that selectively interrupts transmission of the drive force from the propeller shaft to a first auxiliary drive wheel of the pair of auxiliary drive wheels; a second multi-plate clutch that selectively interrupts transmission of the drive force from the propeller shaft to a second auxiliary drive wheel of the pair of auxiliary drive wheels; a first piston that axially presses the first multi-plate clutch; a second piston that axially presses the second multi-plate clutch; and a hydraulic circuit that includes a hydraulic pump and multiple control valves and that supplies, through the control valves, hydraulic oil discharged from the hydraulic pump to first and second cylinder chambers that are provided respectively for the first and second pistons. The method includes the following: during travel of the four-wheel drive vehicle in the two-wheel drive mode, stopping rotation of the propeller shaft by disengaging the dog clutch, the first multi-plate clutch, and the second multi-plate clutch; during a transition from the two-wheel drive mode to the four-wheel drive mode, bringing the pair of meshable members into mesh with each other after rotational synchronization between the pair of meshable members is achieved, caused by increasing the speed of the rotation of the propeller shaft by using torque transmitted from the first auxiliary drive wheel through the first multi-plate clutch so as to achieve the rotational synchronization; and during the transition, keeping the second multi-plate clutch from transmitting torque that increases the speed of the rotation of the propeller shaft.

The four-wheel drive vehicle and the control method according to the aspects described above allow quick switching from the two-wheel drive mode to the four-wheel drive mode while suppressing the occurrence of noise and vibration at the time of switching.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 8 is a timing diagram illustrating an example of how a drive force interrupting device and a drive force distribution device according to a comparative example operate.

DETAILED DESCRIPTION OF EMBODIMENTS

Figure 1:
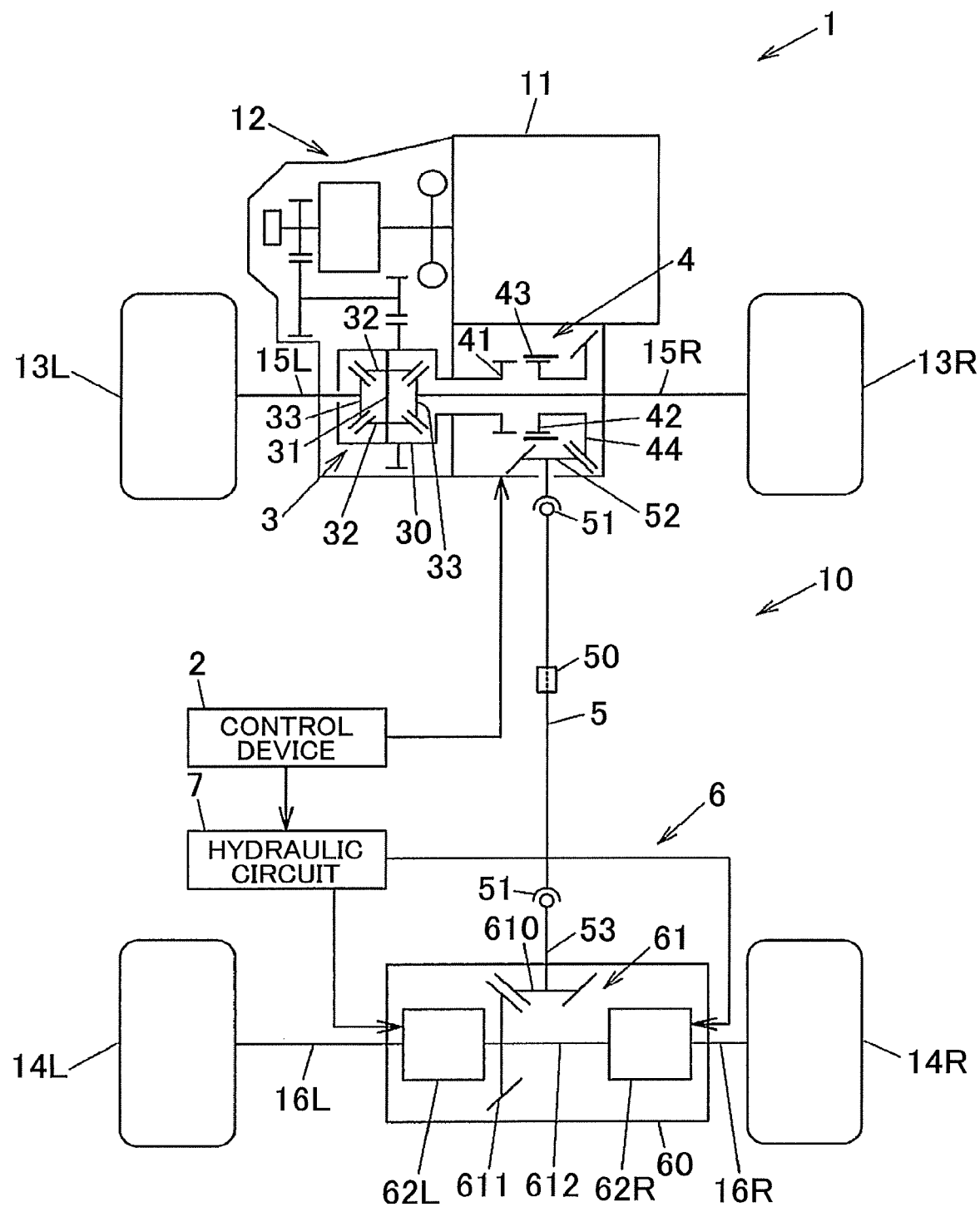
FIG. 1 is a schematic diagram illustrating the structure of a four-wheel drive vehicle according to an embodiment of the invention.

An embodiment of the invention is described with reference to FIGS. 1 to 7. FIG. 1 is a schematic diagram illustrating the structure of a four-wheel drive vehicle 1 according to the embodiment of the invention. The four-wheel drive vehicle 1 includes the following: an engine 11 as a drive source for generating a drive force that the four-wheel drive vehicle 1 uses to travel; a transmission 12 that changes the speed of a rotational output of the engine 11; left and right front wheels 13L and 13R as a pair of main drive wheels; left and right rear wheels 14L and 14R as a pair of auxiliary drive wheels; a drive force transmission system 10 that selectively transmits the drive force of the engine 11 changed in speed by the transmission 12 to the front wheels 13L and 13R and the rear wheels 14L and 14R; and a control device 2. Throughout the embodiment, the notations "L" and "R" in reference numerals are respectively used to denote the left side and the right side with respect to the direction in which the four-wheel drive vehicle 1 moves forward.

The four-wheel drive vehicle 1 is switchable between a four-wheel drive mode and a two-wheel drive mode. The four-wheel drive mode transmits the drive force of the engine 11 to not only the front wheels 13L and 13R, but also the rear wheels 14L and 14R. The two-wheel drive mode transmits the drive force of the engine 11 to only the front wheels 13L and 13R. The drive force of the engine 11 is always transmitted to the front wheels 13L and 13R. On the other hand, the drive force of the engine 11 is transmitted to the rear wheels 14L and 14R in accordance with vehicle traveling conditions or the state of a switch that a driver operates.

Although this embodiment takes an internal-combustion engine as an example of the drive source, the drive source is not limited to an internal-combustion engine. For example, the drive source may be a combination of an engine and a high-power electric motor, such as an interior permanent magnet (IPM) synchronous motor, or may be a high-power electric motor alone.

The drive force transmission system 10 forms a drive force transmission path of the four-wheel drive vehicle 1 from the transmission 12 to the front wheels 13L and 13R and to the rear wheels 14L and 14R. The drive force transmission system 10 includes the following: a front differential 3; drive shafts 15L and 15R respectively located between the front differential 3 and the front wheels 13L and 13R; a drive force interrupting device 4 located adjacent to the front differential 3; a propeller shaft 5 extending in a vehicle longitudinal direction; a drive force distribution device 6 located behind the propeller shaft 5 in the vehicle longitudinal direction; and drive shafts 16L and 16R respectively located between the drive force distribution device 6 and the rear wheels 14L and 14R. The propeller shaft 5 transmits the drive force of the engine 11 to the rear wheels 14L and 14R in the two-wheel drive mode.

The control device 2 controls the drive force interrupting device 4 and the drive force distribution device 6. On the drive force transmission path to the rear wheels 14L and 14R, the drive force interrupting device 4 and the drive force distribution device 6 are located across the propeller shaft 5 from each other. The drive force interrupting device 4 selectively interrupts the transmission of the drive force from the engine 11 to the propeller shaft 5. The drive force distribution device 6 includes a first multi-plate clutch 62L and a second multi-plate clutch 62R. The first multi-plate clutch 62L selectively interrupts the transmission of the drive force from the propeller shaft 5 to the left rear wheel 14L. The second multi-plate clutch 62R selectively interrupts the transmission of the drive force from the propeller shaft 5 to the right rear wheel 14R. Details of the structures of the drive force interrupting device 4 and the drive force distribution device 6 are described later.

When the four-wheel drive vehicle 1 travels in the two-wheel drive mode, the control device 2 controls the drive force interrupting device 4 and the drive force distribution device 6 to interrupt the transmission of the drive force, thereby stopping the rotation of the propeller shaft 5. This reduces power loss that is caused by the rotation of the propeller shaft 5, thus improving fuel economy performance. A state in the two-wheel drive mode where each of the drive force interrupting device 4 and the drive force distribution device 6 interrupts the transmission of the drive force is hereinafter referred to as a disconnected state.

The front differential 3 includes the following: a front differential case 30; a pinion shaft 31 that rotates together with the front differential case 30; a pair of pinion gears 32 supported on the pinion shaft 31; and a pair of side gears 33 that mesh with the pair of pinion gears 32 with their gear axes perpendicular to each other. The front differential 3 is located between the transmission 12 and the drive force interrupting device 4. One of the pair of side gears 33 is coupled to the drive shaft 15L, and the other of the pair of side gears 33 is coupled to the drive shaft 15R.

The propeller shaft 5 includes multiple shaft members that are coupled together by multiple universal joints 51 with crosses. A front end of the propeller shaft 5 in the vehicle longitudinal direction is provided with a drive pinion 52. A rear end of the propeller shaft 5 in the vehicle longitudinal direction is provided with a coupling portion 53 that is coupled to a later-described coupling member 600 of the drive force distribution device 6 such that the coupling portion 53 does not rotate relative to the coupling member 600. The propeller shaft 5 is supported via a center bearing 50 with respect to a vehicle body at half the length of the propeller shaft 5 in such a manner that the propeller shaft 5 is rotatable.

Figure 2A:
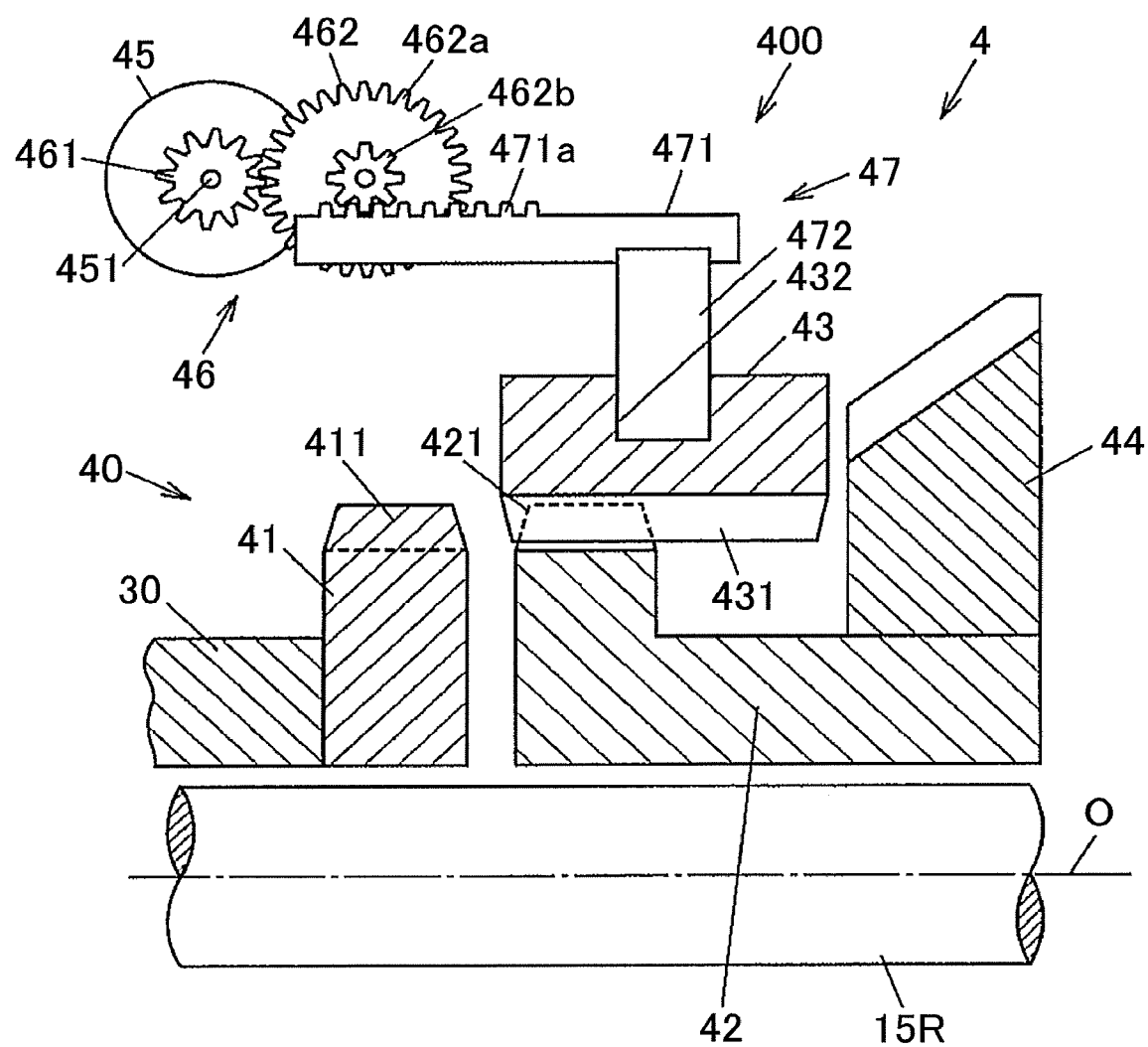
FIG. 2A is a cross-sectional view illustrating an example of the structure of a drive force interrupting device.
Figure 2B:
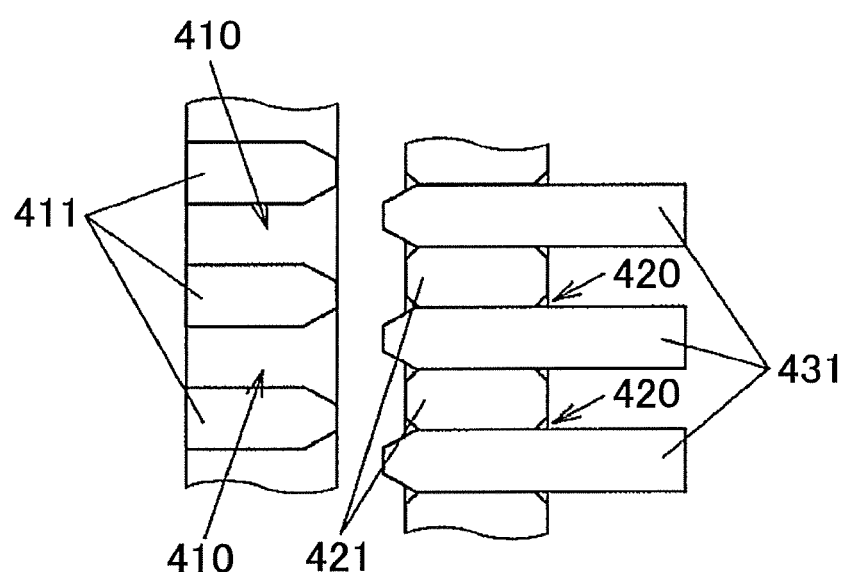
FIG. 2B is a schematic diagram illustrating meshable members of the drive force interrupting device.

FIG. 2A is a cross-sectional view illustrating an example of the structure of the drive force interrupting device 4. FIG. 2B is a schematic diagram illustrating meshable members. FIG. 2A illustrates an upper half of the drive force interrupting device 4 with respect to a rotation axis O of the front differential case 30.

The drive force interrupting device 4 includes a dog clutch 40 that transmits the drive force by engagement between a recessed portion and a projecting portion. Specifically, the drive force interrupting device 4 includes the following: the dog clutch 40 having first, second, and third rotating members 41, 42, and 43 that rotate about the same axis as the front differential case 30; an actuator 400 that actuates the dog clutch 40; and a ring gear 44 that meshes with the drive pinion 52 of the propeller shaft 5. The drive pinion 52 and the ring gear 44 may be, for example, a hypoid gear pair.

The actuator 400 includes the following: an electric motor 45; a speed reducer 46 that reduces the speed of a rotational output of an output shaft 451 of the electric motor 45; and a moving mechanism 47 that axially moves the third rotating member 43 of the dog clutch 40 by using the torque of the electric motor 45 that has been reduced in speed by the speed reducer 46. The electric motor 45 is powered by electric current supplied from the control device 2. The actuator 400 is not limited to the structure described above. Any type of actuator, such as having a ball screw mechanism or an electromagnetic solenoid, may be used as the actuator 400.

The first rotating member 41 is fixed to an axial end of the front differential case 30 and rotates together with the front differential case 30. The second rotating member 42 and the third rotating member 43 are rotatable relative to the first rotating member 41 about the same axis as the first rotating member 41. The third rotating member 43 has a cylindrical shape and is located radially outward from the second rotating member 42 and is axially movable relative to the second rotating member 42.

The first rotating member 41 has an annular shape. An inner circumferential surface of the first rotating member 41 defines an opening through which the drive shaft 15R is inserted. An outer circumferential surface of the first rotating member 41 has multiple spline teeth 411 that extend parallel to the rotation axis O. A recessed portion 410 is formed between each circumferentially adjacent pair of the spline teeth 411. The second rotating member 42 has a cylindrical shape with an opening through which the drive shaft 15R is inserted. The ring gear 44 is fixed to an axial end of the second rotating member 42. An outer circumferential surface of the second rotating member 42 has multiple spline teeth 421 that extend parallel to the rotation axis O. A recessed portion 420 is formed between each circumferentially adjacent pair of the spline teeth 421.

An inner circumferential surface of the third rotating member 43 has multiple spline teeth 431 that are engageable with the spline teeth 411 of the first rotating member 41 and the spline teeth 421 of the second rotating member 42. According to the embodiment, the third rotating member 43 is axially movable with respect to the second rotating member 42, with the spline teeth 431 of the third rotating member 43 in mesh with the recessed portions 420 of the second rotating member 42.

When the third rotating member 43 is moved by the moving mechanism 47 toward the first rotating member 41, the spline teeth 431 serving as projecting portions of the third rotating member 43 come in mesh with the recessed portions 410 of the first rotating member 41, and the third rotating member 43 and the first rotating member 41 are coupled together such that the third rotating member 43 and the first rotating member 41 are not rotatable relative to each other. As such, the third rotating member 43 couples the first rotating member 41 and the second rotating member 42 such that the first rotating member 41 and the second rotating member 42 are not rotatable relative to each other, thus allowing the transmission of the drive force of the engine 11 from the first rotating member 41 to the second rotating member 42. On the other hand, when the third rotating member 43 is moved away from the first rotating member 41, the spline teeth 431 of the third rotating member 43 come out of mesh from the recessed portions 410 of the first rotating member 41. Thus, the first rotating member 41 and the second rotating member 42 are decoupled from each other and become rotatable relative to each other. This interrupts the transmission of the drive force from the first rotating member 41 to the second rotating member 42. The first rotating member 41 and the third rotating member 43 correspond to one aspect of a pair of meshable members according to the embodiment.

The speed reducer 46 includes the following: a pinion gear 461 that rotates together with the output shaft 451 of the electric motor 45; and a reduction gear 462 having a large diameter gear portion 462a and a small diameter gear portion 462b. The pinion gear 461 is in mesh with the large diameter gear portion 462a. The moving mechanism 47 includes the following: a linear motion shaft 471 having rack teeth 471a in mesh with the small diameter gear portion 462b of the reduction gear 462; and a shift fork 472 fixed to the linear motion shaft 471. The third rotating member 43 has an annular groove 432 in which the shift fork 472 is slidably fitted.

When the output shaft 451 of the electric motor 45 rotates, the speed of the rotational output of the output shaft 451 is reduced by the speed reducer 46, and the linear motion shaft 471 moves parallel to the rotation axis O. The movement of the linear motion shaft 471 causes the third rotating member 43 to move between a coupling position and a decoupling position. In the coupling position, the third rotating member 43 is in mesh with both the first rotating member 41 and the second rotating member 42. In the decoupling position, the third rotating member 43 is out of mesh with the first rotating member 41.

As illustrated in FIG. 1, the drive force distribution device 6 includes the following: a housing 60 fixed to the vehicle body; a gear mechanism 61 that receives the drive force from the propeller shaft 5; first and second multi-plate clutches 62L and 62R that adjust the drive force transmitted from the gear mechanism 61 and respectively distribute the adjusted drive force to the rear drive shafts 16L and 16R; and a hydraulic circuit 7 that outputs hydraulic oil for pressing the first and second multi-plate clutches 62L and 62R. The housing 60 houses the first and second multi-plate clutches 62L and 62R and the gear mechanism 61.

The gear mechanism 61 includes a pinion gear 610, a ring gear 611, and a center shaft 612 that rotates together with the ring gear 611. The pinion gear 610 and the ring gear 611 may be, for example, a hypoid gear pair. The center shaft 612 rotates by receiving the rotational force of the propeller shaft 5 via the ring gear 611. The first multi-plate clutch 62L is located between the center shaft 612 and the drive shaft 16L. The second multi-plate clutch 62R is located between the center shaft 612 and the drive shaft 16R.

When switching the four-wheel drive vehicle 1 traveling in the disconnected state where the propeller shaft 5 does not rotate, from the two-wheel drive mode to the four-wheel drive mode, the control device 2 rotates the propeller shaft 5 by transmitting the rotational force of any of the rear wheels 14L and 14R to the propeller shaft 5 through the drive force distribution device 6 so as to achieve rotational synchronization between the first rotating member 41 and the third rotating member 43 of the dog clutch 40. After the rotational synchronization is achieved, the control device 2 brings the third rotating member 43 into mesh with the first rotating member 41 by controlling the actuator 400 of the drive force interrupting device 4. Thus, the four-wheel drive vehicle 1 switches to the four-wheel drive mode. According to the embodiment, as described later, the control device 2 rotates the propeller shaft 5 by transmitting the rotational force of the left rear wheel 14L to the propeller shaft 5 through the first multi-plate clutch 62L. Since the propeller shaft 5 does not rotate in the disconnected state, it is possible to suppress a drag loss between the drive pinion 52 and the ring gear 44, a drag loss between the pinion gear 610 and the ring gear 611, and a bearing loss in the center bearing 50. Thus, power loss due to these losses is suppressed.

Figure 3:
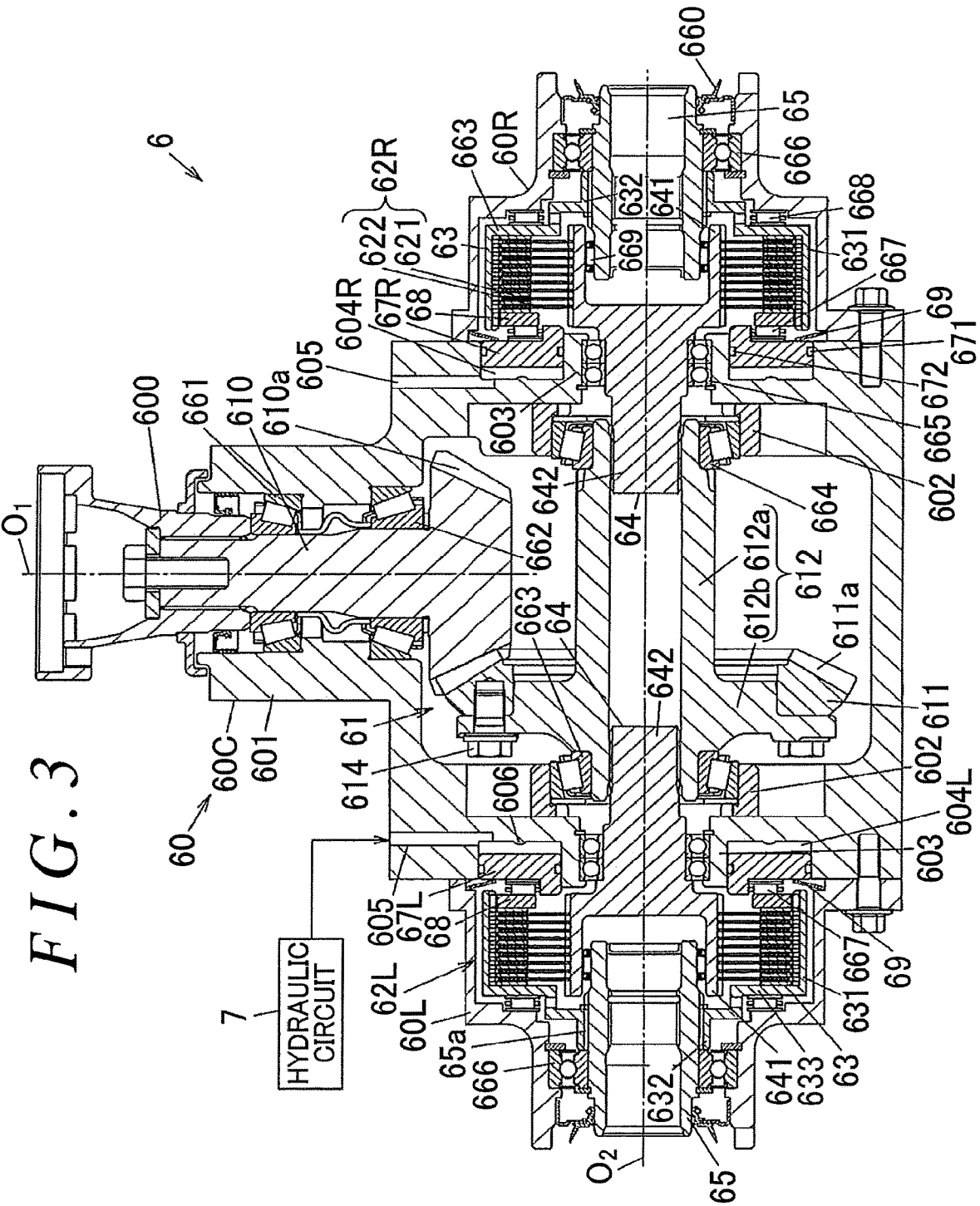
FIG. 3 is a cross-sectional view illustrating a specific example of the structure of a drive force distribution device.
Figure 4:
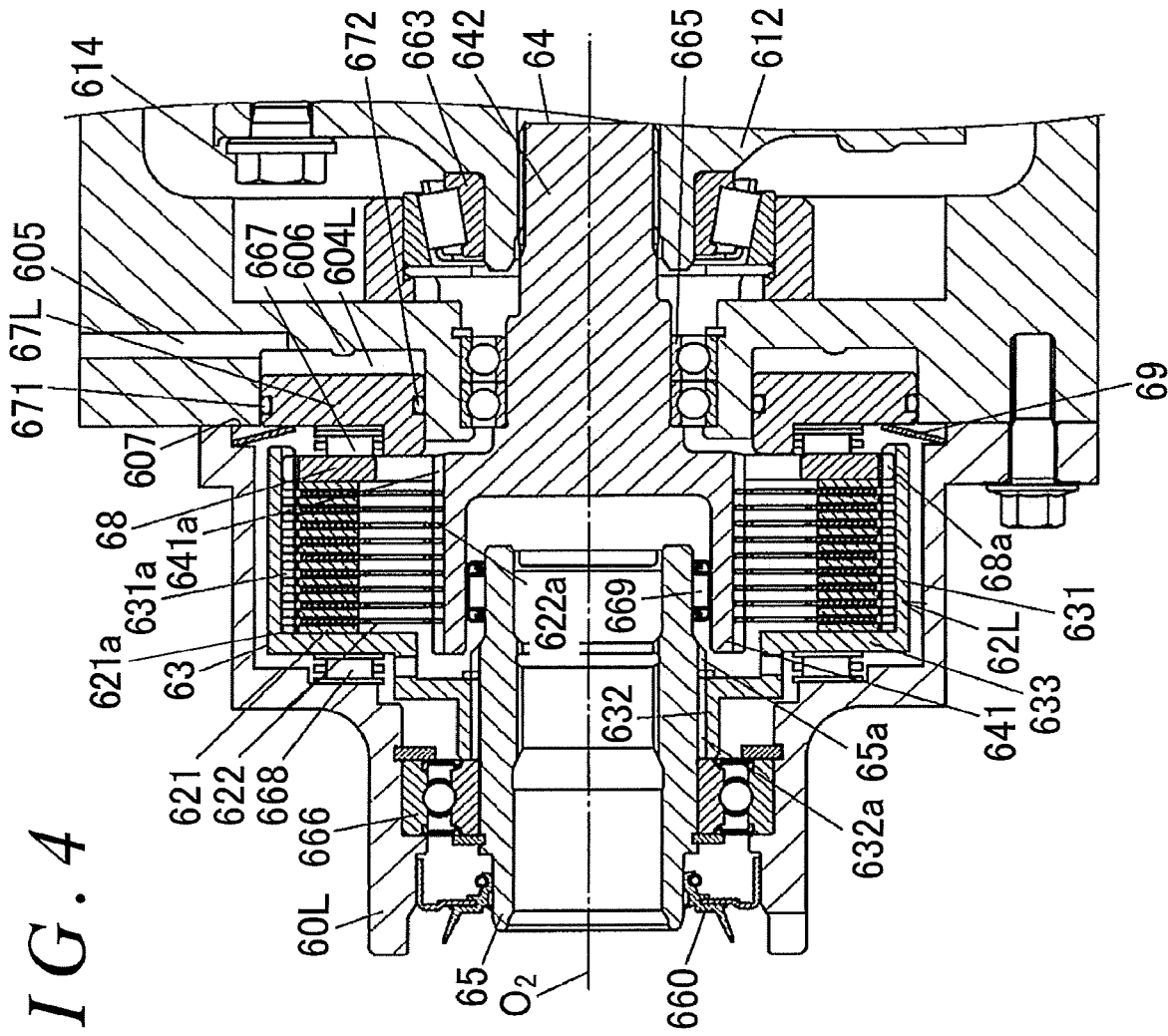
FIG. 4 is a cross-sectional view illustrating a main part including a first multi-plate clutch and its surrounding area.

FIG. 3 is a cross-sectional view illustrating a specific example of the structure of the drive force distribution device 6. FIG. 4 is a cross-sectional view illustrating a main part including the first multi-plate clutch 62L and its surrounding area. The first multi-plate clutch 62L and the second multi-plate clutch 62R have the same structure and are arranged in a bilaterally symmetrical manner. A rotation axis O1 of the pinion gear 610 is parallel to the longitudinal direction of the four-wheel drive vehicle 1. A rotation axis O2 of the center shaft 612 is parallel to the lateral direction of the four-wheel drive vehicle 1. A direction parallel to the rotation axis O2 is hereinafter referred to as an axial direction.

The pinion gear 610 of the gear mechanism 61 of the drive force distribution device 6 is coupled via the coupling member 600 to the coupling portion 53 (see FIG. 1) of the propeller shaft 5 in such a manner that the pinion gear 610 and the coupling portion 53 are not rotatable relative to each other. The drive force distribution device 6 further includes the following: a pair of left and right clutch drums 63 that respectively house the first and second multi-plate clutches 62L and 62R; a pair of left and right inner shafts 64 that are respectively located within the pair of left and right clutch drums 63; a pair of left and right coupling shafts 65 that respectively couple the pair of left and right clutch drums 63 to the rear drive shafts 16L and 16R in such a manner that the pair of left and right clutch drums 63 are not rotatable relative to the drive shafts 16L and 16R respectively; various types of bearings 661 to 669; a first piston 67L for pressing the first multi-plate clutch 62L in the axial direction; a second piston 67R for pressing the second multi-plate clutch 62R in the axial direction; a pair of left and right pressing members 68; and a pair of left and right return springs 69.

The housing 60 includes the following: a center housing member 60C that houses the pinion gear 610, the ring gear 611, and the center shaft 612 of the gear mechanism 61; and side housing members 60L and 60R that respectively house the first and second multi-plate clutches 62L and 62R. The center housing member 60C is located between the side housing member 60L and the side housing member 60R in the vehicle lateral direction. The side housing member 60L is located on the left side of the four-wheel drive vehicle 1, and the side housing member 60R is located on the right side of the four-wheel drive vehicle 1. The center housing member 60C is fixed by bolts to the side housing members 60L and 60R. Lubricating oil (not illustrated) fills the inside of the housing 60 to lubricate the mesh of gears in the gear mechanism 61 and to lubricate frictional sliding in the first and second multi-plate clutches 62L and 62R.

The center housing member 60C includes the following: a first holder 601 that rotatably holds the pinion gear 610 via tapered roller bearings 661 and 662; a second holder 602 that rotatably holds the center shaft 612 via a pair of tapered roller bearings 663 and 664; a third holder 603 that rotatably holds the pair of left and right inner shafts 64 via separate ball bearings 665; a first cylinder chamber 604L that partially houses the first piston 67L such that the first piston 67L is reciprocatable; and a second cylinder chamber 604R that partially houses the second piston 67R such that the second piston 67R is reciprocatable. The first cylinder chamber 604L is formed in the left end of the center housing member 60C in the vehicle lateral direction and opens toward the side housing member 60L. The second cylinder chamber 604R is formed in the right end of the center housing member 60C in the vehicle lateral direction and opens toward the side housing member 60R. Each of the pair of coupling shafts 65 is supported on a corresponding one of the side housing members 60L and 60R via a ball bearing 666.

The center shaft 612 integrally includes a cylindrical portion 612a extending along the rotation axis O2 and a flange portion 612b protruding radially outward from an end of the cylindrical portion 612a. The ring gear 611 has multiple meshing teeth 611a in mesh with a gear portion 610a of the pinion gear 610. The ring gear 611 is fixed by a bolt 614 to the flange portion 612b of the center shaft 612.

Each of the first and second multi-plate clutches 62L and 62R includes the following: multiple outer clutch plates 621 that are engaged with the corresponding clutch drum 63 in such a manner that the outer clutch plates 621 are movable in the axial direction relative to the clutch drum 63 and that the outer clutch plates 621 is not rotatable relative to the clutch drum 63; and multiple inner clutch plates 622 that are engaged with the corresponding inner shaft 64 in such a manner that the inner clutch plates 622 are movable in the axial direction relative to the inner shaft 64 and that the inner clutch plates 622 are not rotatable relative to the inner shaft 64. The outer clutch plates 621 alternate with the inner clutch plates 622 in the axial direction. The outer clutch plates 621 and the inner clutch plates 622 of the first multi-plate clutch 62L are pressed against each other by the first piston 67L so that frictional force is generated therebetween. The outer clutch plates 621 and the inner clutch plates 622 of the second multi-plate clutch 62R are pressed against each other by the second piston 67R so that frictional force is generated therebetween.

The first piston 67L is moved in the axial direction by the pressure of the hydraulic oil that is supplied from the hydraulic circuit 7 to the first cylinder chamber 604L. The second piston 67R is moved in the axial direction by the pressure of the hydraulic oil that is supplied from the hydraulic circuit 7 to the second cylinder chamber 604R. The center housing member 60C has supply flow passages 605. Each of the supply flow passages 605 guides the hydraulic oil supplied from the hydraulic circuit 7 to a corresponding one of the first and second cylinder chambers 604L and 604R. An annular sealing member 671 is located on an outer circumferential surface of each of the first and second pistons 67L and 67R. An annular sealing member 672 is located on an inner circumferential surface of each of the first and second pistons 67L and 67R.

Each of the first and second multi-plate clutches 62L and 62R is pressed via the needle roller bearing 667 and the pressing member 68 by a corresponding one of the first and second pistons 67L and 67R that receive the pressure of the hydraulic oil. This brings the outer clutch plates 621 and the inner clutch plates 622 into frictional contact with each other, thereby transmitting torque between the inner shaft 64 and the clutch drum 63. As such, the drive force of the engine 11 is transmitted to the rear wheels 14L and 14R through the first and second multi-plate clutches 62L and 62R respectively. Each of the pressing members 68 rotate together with the corresponding clutch drum 63. Each of the needle roller bearings 667 is located between the corresponding pressing member 68 and a corresponding one of the first and second pistons 67L and 67R.

When the pressures in the first and second cylinder chambers 604L and 604R fall, the first and second pistons 67L and 67R are respectively moved toward the bottoms of the first and second cylinder chambers 604L and 604R by the biasing forces of the return springs 69, so that the first and second pistons 67L and 67R come in abutment with corresponding abutment portions 606 at their axial ends on the side opposite to the side where the pressing members 68 are located. Each of the abutment portions 606 is located on the bottom of a corresponding one of the first and second cylinder chambers 604L and 604R. The positions of the first and second pistons 67L and 67R when the first and second pistons 67L and 67R come in abutment with the corresponding abutment portions 606 are hereinafter referred to as initial positions. When the first and second pistons 67L and 67R are in the respective initial positions, the outer clutch plates 621 and the inner clutch plates 622 of each of the first and second multi-plate clutches 62L and 62R are disengaged from each other and are rotatable relative to each other so that the transmission of the drive force from the engine 11 to the rear wheels 14L and 14R is interrupted.

According to the embodiment, the return springs 69 are disc springs. Each of the side housing members 60L and 60R has an annular recess 607 that houses the outer edge of the corresponding return spring 69. The inner edge of each of the return springs 69 abuts against a corresponding one of the first and second pistons 67L and 67R. Alternatively, the return springs 69 may be coil springs, wave washers, or elastic members made of rubber or other elastic material.

Each of the clutch drums 63 integrally includes a large diameter cylindrical portion 631, a small diameter cylindrical portion 632, and a side wall portion 633 between the large diameter cylindrical portion 631 and the small diameter cylindrical portion 632. As illustrated in FIG. 4, the outer clutch plates 621 have spline projections 621a on their outer edges, and the spline projections 621a are engaged with straight spline fit portions 631a that are formed on the inner circumferential surface of the large diameter cylindrical portion 631 of the clutch drum 63. This engagement allows the outer clutch plates 621 to rotate together with the clutch drum 63. Each of the thrust needle roller bearings 668 is located between the side wall portion 633 of the corresponding clutch drum 63 and a corresponding one of the side housing members 60L and 60R.

The pressing member 68 is formed from an annular plate and has spline projections 68a on its outer edge. The spline projections 68a are engaged with the straight spline fit portions 631a of the clutch drum 63 such that the pressing member 68 is movable in the axial direction and is not rotatable, relative to the clutch drum 63. Spline fit portions 632a are formed on the inner circumferential surface of the small diameter cylindrical portion 632 of the clutch drum 63 and are splined with spline fit portions 65a that are formed on the outer circumferential surface of the coupling shaft 65.

Thus, the clutch drum 63 is coupled to the coupling shaft 65 such that the clutch drum 63 is not rotatable relative to the coupling shaft 65.

The inner shaft 64 includes a cylindrical portion 641 that houses one end of the coupling shaft 65, and a solid cylindrical shaft portion 642. A tip end of the shaft portion 642 is splined to the center shaft 612 so that the inner shaft 64 is not rotatable relative to the center shaft 612. The needle roller bearing 669 is located between the inner circumferential surface of the cylindrical portion 641 and the outer circumferential surface of the coupling shaft 65. A sealing member 660 is located between the inner surface of an end opening of each of the side housing members 60L and 60R in the vehicle lateral direction and the outer circumferential surface of the coupling shaft 65.

The inner clutch plates 622 have spline projections 622a on their inner edges, and the spline projections 622a are engaged with straight spline fit portions 641a that are formed on the outer circumferential surface of the cylindrical portion 641 of the inner shaft 64. This engagement allows the inner clutch plates 622 to rotate together with the inner shaft 64.

Figure 5A:
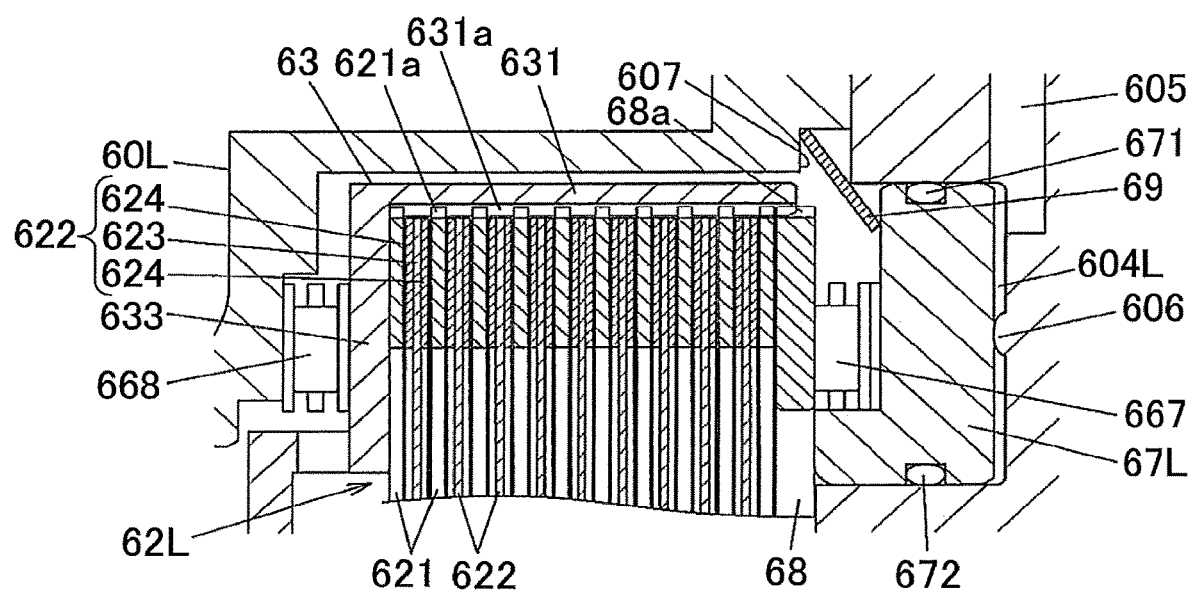
FIG. 5A is an enlarged view partially illustrating the first multi-plate clutch and its surrounding area when a first piston is in an initial position.
Figure 5B:
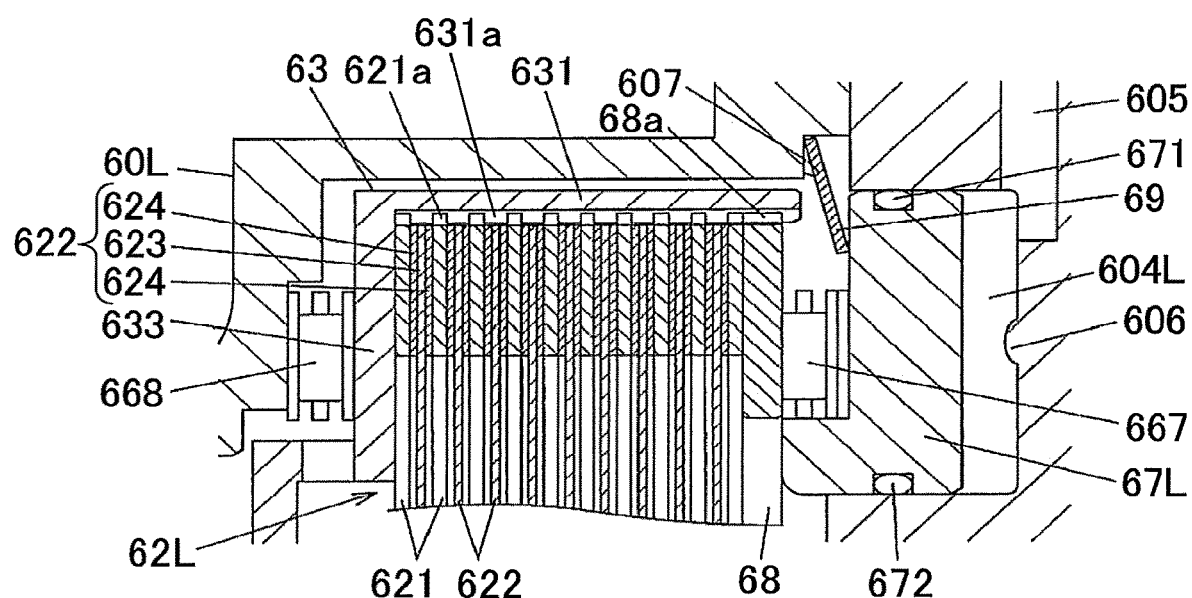
FIG. 5B is an enlarged view partially illustrating the first multi-plate clutch and its surrounding area when clearances between outer clutch plates and inner clutch plates are eliminated.
Figure 5C:
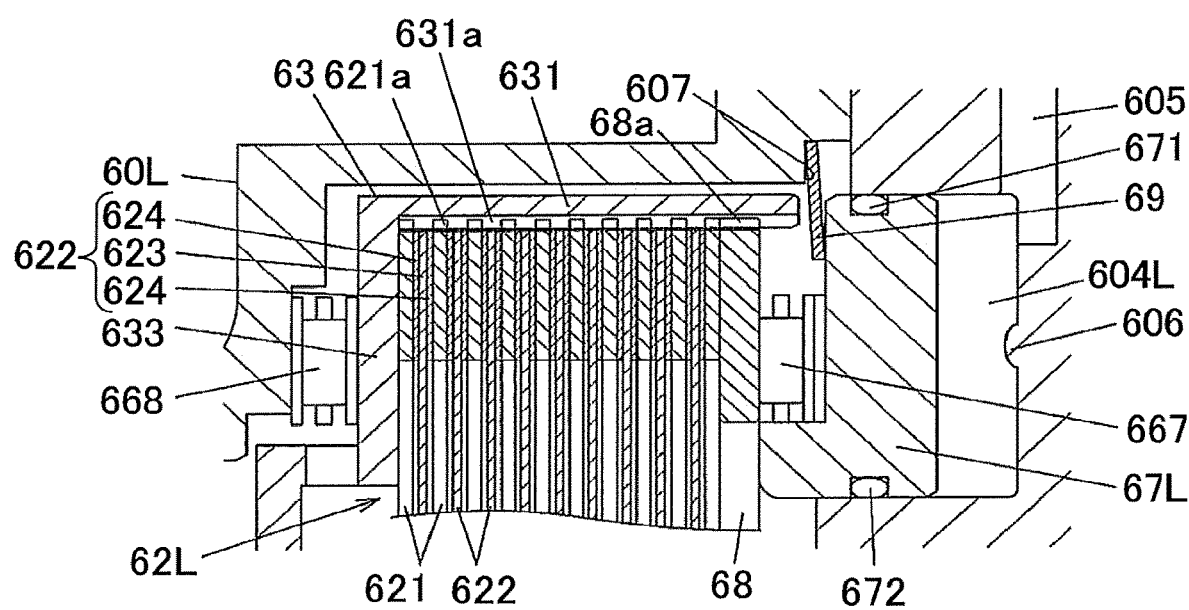
FIG. 5C is an enlarged view partially illustrating the first multi-plate clutch and its surrounding area when the first piston is further moved from the state shown in FIG. 5B and presses the outer clutch plates and the inner clutch plates against each other so that the outer clutch plates and the inner clutch plates are in frictional contact with each other.

FIGS. 5A to 5C are enlarged views partially illustrating the first multi-plate clutch 62L and its surrounding area. FIG. 5A shows a state where the first piston 67L is in the initial position. FIG. 5B shows a state where the clearances between the outer clutch plates 621 and the inner clutch plates 622 are eliminated. FIG. 5C shows a state where the first piston 67L is further moved from the state shown in FIG. 5B and presses the outer clutch plates 621 and the inner clutch plates 622 against each other so that the outer clutch plates 621 and the inner clutch plates 622 are in frictional contact with each other.

Each of the inner clutch plates 622 includes an annular base 623 formed from a metal plate, and a friction member 624 bonded on each side of the base 623. The friction member 624 may be, for example, formed from paper friction material or non-woven fabric material, and is bolded on the base 623 such that the friction member 624 faces an adjacent one of the outer clutch plates 621. The base 623 may be, for example, made of iron-based metal. Each of the outer clutch plates 621 may be, for example, an annular plate made of iron-based metal and has an oil groove (not illustrated) on its surface.

As illustrated in FIG. 5A, in an initial state where the first piston 67L is in the initial position, there is a clearance between at least one of the outer clutch plates 621 and the inner clutch plate 622 that is located adjacent to the at least one of the outer clutch plates 621. In this initial state, lubricating oil fills the clearances between the outer clutch plates 621 and the inner clutch plates 622, specifically, the clearances between the outer clutch plates 621 and the friction members 624 of the inner clutch plates 622, thus allowing smooth relative rotation between the outer clutch plates 621 and the inner clutch plates 622.

As illustrated in FIG. 5B, when the first piston 67L is moved from the initial position, and all the clearances between the outer clutch plates 621 and the inner clutch plates 622 are eliminated, the lubricating oil is pushed out from between the outer clutch plates 621 and the inner clutch plates 622. In this state, although the outer clutch plates 621 may be in sliding contact with the friction member 624 of the inner clutch plates 622, there is no transmission of torque that is caused by frictional contact between the outer clutch plates 621 and the inner clutch plates 622.

When the first piston 67L is further moved after the clearances in the first multi-plate clutch 62L are eliminated, the friction members 624 of the inner clutch plates 622 are compressed in the axial direction between the side wall portion 633 of the clutch drum 63 and the pressing member 68, as illustrated in FIG. 5C. Thus, the outer clutch plates 621 and the inner clutch plates 622 come into frictional contact with each other so that torque is transmitted between the clutch drum 63 and the inner shaft 64.

Figure 6:
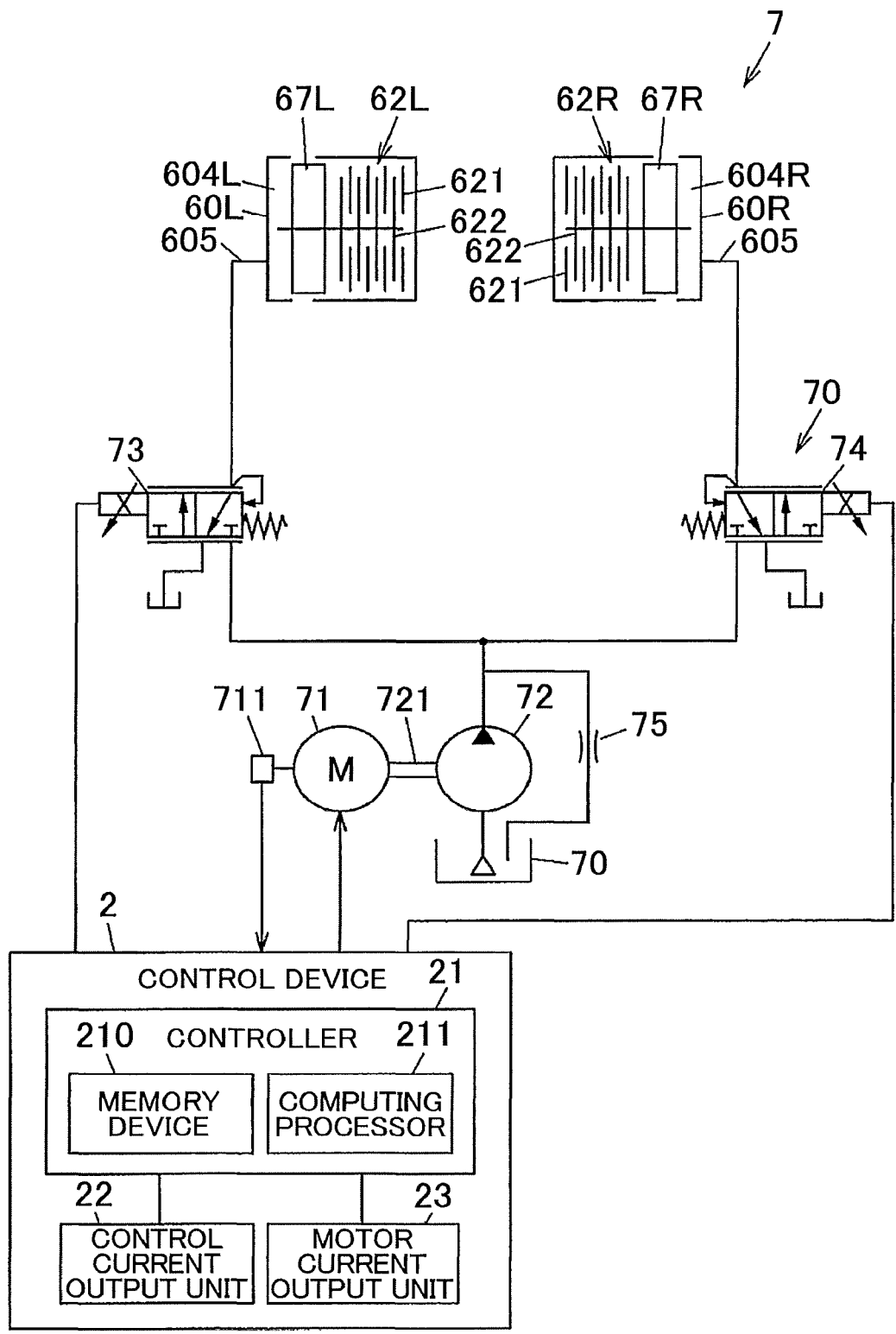
FIG. 6 is a schematic diagram illustrating an example of the structure of a hydraulic circuit and a control device.

FIG. 6 is a schematic diagram illustrating an example of the structure of the hydraulic circuit 7 and the control device 2. The hydraulic circuit 7 includes the following: an electric motor 71 that generates torque in accordance with electric current supplied from the control device 2; a single hydraulic pump 72 that is driven by the electric motor 71; a first control valve 73; a second control valve 74; and a relief valve 75. The electric motor 71 and the hydraulic pump 72 are coupled together by a coupling shaft 721. A reducer may be provided between the coupling shaft 721 and the electric motor 71 to reduce the speed of a rotational output of the electric motor 71 at a predetermined reduction ratio. The electric motor 71 may be, for example, a brushless direct current (DC) motor. Alternatively, the electric motor 71 may be a brush DC motor. The electric motor 71 has a rotational speed sensor 711 that detects the rotational speed of the electric motor 71 and that outputs the detected speed to the control device 2.

The hydraulic pump 72 has a common structure. The hydraulic pump 72 draws hydraulic oil from a reservoir 70 and discharges the hydraulic oil at a discharge pressure corresponding to the number of revolutions (the rotational speed) of the coupling shaft 721. The hydraulic pump 72 may be, for example, an external gear pump, an internal gear pump, or a vane pump. The relief valve 75 is located between the discharge side of the hydraulic pump 72 and the reservoir 70. The relief valve 75 is a fixed throttle valve and returns, to the reservoir 70, an amount of hydraulic oil corresponding to the discharge pressure of the hydraulic pump 72.

The first control valve 73 is located in an oil passage that extends from the hydraulic pump 72 to the first cylinder chamber 604L through the supply flow passage 605 of the side housing member 60L. The second control valve 74 is located in an oil passage that extends from the hydraulic pump 72 to the second cylinder chamber 604R through the supply flow passage 605 of the side housing member 60R. The first and second control valves 73 and 74 are pressure control valves, specifically electromagnetic proportional pressure control valves. The first control valve 73 adjusts the pressure of the hydraulic oil that is supplied from the hydraulic pump 72 to the first cylinder chamber 604L. The second control valve 74 adjusts the pressure of the hydraulic oil that is supplied from the hydraulic pump 72 to the second cylinder chamber 604R.

Each of the first and second control valves 73 and 74 has an electromagnetic solenoid (not illustrated), and electric current from the control device 2 is supplied to coils of the electromagnetic solenoid. The electromagnetic solenoid moves a valve member against the biasing force of a spring. In the first control valve 73, the degree of opening of a passage through which hydraulic oil flows from the hydraulic pump 72 side to the supply flow passage 605 side changes with the electric current supplied to the first control valve 73. In the second control valve 74, the degree of opening of a passage through which hydraulic oil flows from the hydraulic pump 72 side to the supply flow passage 605 side changes with the electric current supplied to the second control valve 74. The hydraulic oil discharged from the hydraulic pump 72 is distributed and supplied by the first and second control valves 73 and 74 respectively to the first and second cylinder chambers 604L and 604R.

The pressure of hydraulic oil in the first cylinder chamber 604L increases with an increase in the degree of opening of the first control valve 73. The pressure of hydraulic oil in the second cylinder chamber 604R increases with an increase in the degree of opening of the second control valve 74. The electric current that the control device 2 supplies to the first and second control valves 73 and 74 to adjust the pressure of hydraulic oil supplied to the first and second cylinder chambers 604L and 604R is hereinafter referred to as control current. According to the embodiment, the degree of opening increases with an increase in the control current. Alternatively, the degree of opening may decrease with an increase in the control current.

The first and second control valves 73 and 74 drain part of the hydraulic oil discharged from the hydraulic pump 72 to reduce the pressure of the hydraulic oil and then respectively output the hydraulic oil to the first and second cylinder chambers 604L and 604R. The pressure of the hydraulic oil output from the first and second control valves 73 and 74 changes, for example, in proportion to the control current. The control device 2 controls the electric motor 71 such that the discharge pressure of the hydraulic pump 72 is higher than the pressure of the hydraulic oil supplied to each of the first and second cylinder chambers 604L and 604R.

The control device 2 includes the following: a controller 21 having a semiconductor memory device 210 and a computing processor 211; a control current output unit 22 that outputs the control current to the first and second control valves 73 and 74; and a motor current output unit 23 that outputs motor current to the electric motor 71. The computing processor 211 performs a later-described control process by executing a program stored in the memory device 210. Each of the control current output unit 22 and the motor current output unit 23 has switching elements for switching a DC power source, such as a battery, mounted on the four-wheel drive vehicle 1 and outputs electric current corresponding to a duty ratio of a pulse width modulation (PWM) signal that is output from the controller 21.

Next, a method by which the controller 21 of the control device 2 controls the four-wheel drive vehicle 1 is described. When the four-wheel drive vehicle 1 travels in the two-wheel drive mode, the controller 21 keeps the dog clutch 40, the first multi-plate clutch 62L, and the second multi-plate clutch 62R disengaged, thus bringing the four-wheel drive vehicle 1 into the disconnected state where the rotation of the propeller shaft 5 is stopped. During a transition from the two-wheel drive mode to the four-wheel drive mode, the controller 21 increases the speed of the rotation of the propeller shaft 5 by using torque transmitted from the left rear wheel 14L through the first multi-plate clutch 62L so as to achieve the rotational synchronization between the first and third rotating members 41 and 43 of the dog clutch 40, and brings the first and third rotating members 41 and 43 into mesh with each other after the rotational synchronization is achieved. At this time, the controller 21 keeps the second multi-plate clutch 62R from transmitting torque that increases the rotational speed of the propeller shaft 5. The control process that the controller 21 performs is described in detail below with reference to FIG. 7.

Figure 7:
FIG. 7 is a timing diagram illustrating an example of how the drive force interrupting device and the drive force distribution device operate when the four-wheel drive vehicle traveling in a disconnected state switches from a two-wheel drive mode to a four-wheel drive mode.

FIG. 7 is a timing diagram illustrating an example of how the drive force interrupting device 4 and the drive force distribution device 6 operate when the four-wheel drive vehicle 1 traveling in the disconnected state switches from the two-wheel drive mode to the four-wheel drive mode. In the disconnected state, the controller 21 disengages the drive force interrupting device 4 and closes the first control valve 73 and the second control valve 74, thereby stopping the rotation of the propeller shaft 5. At a time t1 when the controller 21 starts control of the transition from the disconnected state to the four-wheel drive mode, the controller 21 starts supplying the motor current to the electric motor 71 and starts supplying the control current to the first control valve 73, thereby fully opening the first control valve 73. This starts to eliminate the clearances between the outer clutch plates 621 and the inner clutch plates 622 of the first multi-plate clutch 62L. At this time, the second control valve 74 still remains fully closed.

At a time t2 when the elimination of the clearances in the first multi-plate clutch 62L is completed, the controller 21 changes the opening degree of the first control valve 73 to a value corresponding to the drive force that needs to be transmitted to the left rear wheel 14L in the four-wheel drive mode, while continuing to supply the hydraulic oil to the first cylinder chamber 604L. Thus, the first multi-plate clutch 62L starts to transmit torque, and the speed of the rotation of the propeller shaft 5 starts to increase accordingly. The determination of whether the elimination of the clearances in the first multi-plate clutch 62L is completed may be based on the amount of rotation of the electric motor 71 since the start of rotation of the electric motor 71 or may be based on an elapsed time from the time t1, for example. Alternatively, this determination may be based on a detection value of a position senor that detects the position of the first piston 67L.

At the time t2, the controller 21 supplies the control current to the second control valve 74, thereby fully opening the second control valve 74. This starts to eliminate the clearances between the outer clutch plates 621 and the inner clutch plates 622 of the second multi-plate clutch 62R. The elimination of the clearances in the second multi-plate clutch 62R is completed at a time t3. In the state where the elimination of the clearances in the second multi-plate clutch 62R is completed, although the friction members 624 of the inner clutch plates 622 and the outer clutch plates 621 of the second multi-plate clutch 62R may be in contact with each other, there is no transmission of torque that is caused by frictional contact between the outer clutch plates 621 and the inner clutch plates 622 of the second multi-plate clutch 62R.

At the time t3, the controller 21 reduces the control current that is supplied to the second control valve 74 such that the degree of opening of the second control valve 74 is reduced to a predetermined degree of opening. The predetermined degree of opening of the second control valve 74 keeps the clearances in the second multi-plate clutch 62R eliminated, without causing transmission of torque that is caused by frictional contact between the outer clutch plates 621 and the inner clutch plates 622 of the second multi-plate clutch 62R. The second control valve 74 is maintained to the predetermined degree of opening until the time t5 described later.

At a time t4 when the rotational synchronization between the first rotating member 41 and the third rotating member 43 of the dog clutch 40 is achieved, the controller 21 starts to supply electric current to the electric motor 45 of the actuator 400. Thus, the third rotating member 43 moves toward the first rotating member 41, and the first rotating member 41 and the third rotating member 43 are in complete mesh with each other at a time t5. At the time t5, the clearances between the outer clutch plates 621 and the inner clutch plates 622 of the second multi-plate clutch 62R remain eliminated. In other words, the controller 21 finishes eliminating the clearances between the outer clutch plates 621 and the inner clutch plates 622 of the second multi-plate clutch 62R before the first rotating member 41 and the third rotating member 43 completely mesh with each other.

It is determined that the rotational synchronization between the first rotating member 41 and the third rotating member 43 is achieved, for example, when the difference between the rotational speed of the third rotating member 43 and the rotational speed of the first rotating member 41 remains less than a predetermined value for a predetermined period of time. The rotational speed of the third rotating member 43 may be calculated from the rotational speed of the propeller shaft 5. The rotational speed of the first rotating member 41 may be calculated from the rotational speed of the front wheels 13L and 13R. If it is determined that an elapsed time from the time t2 exceeds a time required to achieve the rotational synchronization of the dog clutch 40, the controller 21 may start to supply electric current to the electric motor 45.

At the time t5 when the first rotating member 41 and the third rotating member 43 completely mesh with each other, the controller 21 changes the degree of opening of the second control valve 74 to a value corresponding to the drive force that needs to be transmitted to the right rear wheel 14R in the four-wheel drive mode. Thus, the four-wheel drive vehicle 1 switches to the four-wheel drive mode that transmits the drive force of the engine 11 to not only the left and right front wheels 13L and 13R, but also the left and right rear wheels 14L and 14R.

In the example illustrated in FIG. 7, the degree of opening of the first control valve 73 from the time t2 to the time t5 is set to a value corresponding to the drive force that needs to be transmitted to the left rear wheel 14L in the four-wheel drive mode. Alternatively, the degree of opening of the first control valve 73 from the time t2 to the time t5 may be set to a predetermined value that transmits, to the propeller shaft 5, torque that appropriately increases the rotational speed of the propeller shaft 5 while suppressing the vibration of the propeller shaft 5.

FIG. 8 is a timing diagram illustrating an example of how the drive force interrupting device 4 and the drive force distribution device 6 according to a comparative example operate. The comparative example differs from the embodiment illustrated in FIG. 7 in that at the time t3, the controller 21 changes the degree of opening of the second control valve 74 to a value corresponding to the drive force that needs to be transmitted to the right rear wheel 14R in the four-wheel drive mode.

As illustrated in FIG. 8, if the degree of opening of the second control valve 74 is changed at the time t3 to a value corresponding to the drive force that needs to be transmitted to the right rear wheel 14R in the four-wheel drive mode, the outer clutch plates 621 and the inner clutch plates 622 of the second multi-plate clutch 62R come into frictional contact with each other just after the time t3 so that torque that increases the rotational speed of the propeller shaft 5 is transmitted through the second multi-plate clutch 62R. In the comparative example, although the rotational synchronization of the dog clutch 40 is achieved at a time prior to the time t4 in FIG. 7, the propeller shaft 5 may be sharply accelerated when torque from the second multi-plate clutch 62R is transmitted to the propeller shaft 5. The sharp acceleration may produce noise and vibration in the drive force transmission system 10, thus making a driver and passengers feel a sense of discomfort.

As described above, according to the embodiment, when the four-wheel drive vehicle 1 traveling in the disconnected state switches from the two-wheel drive mode to the four-wheel drive mode, the second multi-plate clutch 62R does not transmit torque that increases the speed of the rotation of the propeller shaft 5, and only torque transmitted through the first multi-plate clutch 62L is used to increase the rotational speed of the propeller shaft 5 until the rotational synchronization of the dog clutch 40 is achieved. This feature removes the possibility that the rotation of the propeller shaft 5 is sharply accelerated before the first rotating member 41 and the third rotating member 43 mesh with each other, thus suppressing the occurrence of noise and vibration.

Further, according to the embodiment, the clearances between the outer clutch plates 621 and the inner clutch plates 622 of the second multi-plate clutch 62R are eliminated before the first rotating member 41 and the third rotating member 43 come into mesh with each other. This feature makes it possible to transmit the necessary drive force to the right rear wheel 14R just after the first rotating member 41 and the third rotating member 43 come into mesh with each other.

Furthermore, the controller 21 supplies the hydraulic oil to the second cylinder chamber 604R after the clearances in the first multi-plate clutch 62L are eliminated. Thus, almost all the hydraulic oil discharged from the hydraulic pump 72, except some amount of leakage from the relief valve 75 and the first control valve 73, is supplied to the first cylinder chamber 604L until the elimination of the clearances in the first multi-plate clutch 62L is completed. This feature reduces the time required to eliminate the clearances in the first multi-plate clutch 62L.

The embodiment may be modified in various ways within the scope of the invention. For example, according to the embodiment, when the four-wheel drive vehicle 1 traveling in the disconnected state switches from the two-wheel drive mode to the four-wheel drive mode, the rotational speed of the propeller shaft 5 is increased by using torque transmitted from the left rear wheel 14L through the first multi-plate clutch 62L. Alternatively, the rotational speed of the propeller shaft 5 may be increased by using torque transmitted from the right rear wheel 14R through the second multi-plate clutch 62R. In this alternative example, the first multi-plate clutch 62L is kept from transmitting torque that increases the rotational speed of the propeller shaft 5.

What is claimed is:

1. A four-wheel drive vehicle switchable between a four-wheel drive mode and a two-wheel drive mode, the four-wheel drive mode transmitting a drive force from a drive source to both a pair of main drive wheels and a pair of auxiliary drive wheels, the two-wheel drive mode transmitting the drive force to only the pair of main drive wheels, the four-wheel drive vehicle comprising:
   a propeller shaft that transmits the drive force to the pair of auxiliary drive wheels in the four-wheel drive mode;
   a dog clutch including a pair of meshable members that are rotatable relative to each other, the dog clutch selectively interrupting transmission of the drive force from the drive source to the propeller shaft;
   a first multi-plate clutch that selectively interrupts transmission of the drive force from the propeller shaft to a first auxiliary drive wheel of the pair of auxiliary drive wheels;
   a second multi-plate clutch that selectively interrupts transmission of the drive force from the propeller shaft to a second auxiliary drive wheel of the pair of auxiliary drive wheels;

a first piston that axially presses the first multi-plate clutch;

a second piston that axially presses the second multi-plate clutch;

a hydraulic circuit including a hydraulic pump and a plurality of control valves, the hydraulic circuit supplying, through the plurality of control valves, hydraulic oil discharged from the hydraulic pump to first and second cylinder chambers that are provided respectively for the first and second pistons; and a control device that controls the dog clutch and the hydraulic circuit, wherein during travel of the four-wheel drive vehicle in the two-wheel drive mode, the control device stops rotation of the propeller shaft by disengaging the dog clutch, the first multi-plate clutch, and the second multi-plate clutch, during a transition from the two-wheel drive mode to the four-wheel drive mode, the control device increases a speed of the rotation of the propeller shaft by using torque transmitted from the first auxiliary drive wheel through the first multi-plate clutch so as to achieve rotational synchronization between the pair of meshable members, and brings the pair of meshable members into mesh with each other after the rotational synchronization is achieved, and during the transition, the control device keeps the second multi-plate clutch from transmitting torque that increases the speed of the rotation of the propeller shaft.

2. The four-wheel drive vehicle according to claim 1, wherein each of the first and second multi-plate clutches has a plurality of clutch plates that come into frictional contact with each other by being axially pressed, and the control device supplies the hydraulic oil to the second cylinder chamber to eliminate clearances between the plurality of clutch plates of the second multi-plate clutch before the pair of meshable members come into mesh with each other.

3. The four-wheel drive vehicle according to claim 2, wherein the control device supplies the hydraulic oil to the second cylinder chamber after eliminating clearances between the plurality of clutch plates of the first multi-plate clutch.

4. A method for controlling a four-wheel drive vehicle switchable between a four-wheel drive mode and a two-wheel drive mode, the four-wheel drive mode transmitting a drive force from a drive source to both a pair of main drive wheels and a pair of auxiliary drive wheels, the two-wheel drive mode transmitting the drive force to only the pair of main drive wheels, the four-wheel drive vehicle including:

a propeller shaft that transmits the drive force to the pair of auxiliary drive wheels in the four-wheel drive mode;

a dog clutch including a pair of meshable members that are rotatable relative to each other, the dog clutch selectively interrupting transmission of the drive force from the drive source to the propeller shaft;

a first multi-plate clutch that selectively interrupts transmission of the drive force from the propeller shaft to a first auxiliary drive wheel of the pair of auxiliary drive wheels;

a second multi-plate clutch that selectively interrupts transmission of the drive force from the propeller shaft to a second auxiliary drive wheel of the pair of auxiliary drive wheels;

a first piston that axially presses the first multi-plate clutch;

a second piston that axially presses the second multi-plate clutch; and a hydraulic circuit including a hydraulic pump and a plurality of control valves, the hydraulic circuit supplying, through the plurality of control valves, hydraulic oil discharged from the hydraulic pump to first and second cylinder chambers that are provided respectively for the first and second pistons, the method comprising:

during travel of the four-wheel drive vehicle in the two-wheel drive mode, stopping rotation of the propeller shaft by disengaging the dog clutch, the first multi-plate clutch, and the second multi-plate clutch;

during a transition from the two-wheel drive mode to the four-wheel drive mode, bringing the pair of meshable members into mesh with each other after rotational synchronization between the pair of meshable members is achieved, caused by increasing a speed of the rotation of the propeller shaft by using torque transmitted from the first auxiliary drive wheel through the first multi-plate clutch so as to achieve the rotational synchronization; and during the transition, keeping the second multi-plate clutch from transmitting torque that increases the speed of the rotation of the propeller shaft.

\* \* \* \* \*